United States Patent
Hashizume et al.

(10) Patent No.: US 7,114,166 B2
(45) Date of Patent: Sep. 26, 2006

(54) DISC CARTRIDGE

(75) Inventors: Kenji Hashizume, Tokyo (JP); Yukio Miyazaki, Tokyo (JP); Masaru Ikebe, Tokyo (JP)

(73) Assignee: TDK Corporation, Tokyo (JP)

( * ) Notice: Subject to any disclaimer, the term of this patent is extended or adjusted under 35 U.S.C. 154(b) by 297 days.

(21) Appl. No.: 10/778,074

(22) Filed: Feb. 17, 2004

(65) Prior Publication Data

US 2004/0163099 A1    Aug. 19, 2004

(30) Foreign Application Priority Data

Feb. 18, 2003    (JP) ............................... 2003-39135

(51) Int. Cl.
*G11B 23/03*    (2006.01)
(52) U.S. Cl. ................................... 720/738
(58) Field of Classification Search ......... 720/738–743
See application file for complete search history.

(56) References Cited

U.S. PATENT DOCUMENTS

| | | | |
|---|---|---|---|
| 6,356,527 B1* | 3/2002 | Shiomi et al. | 720/738 |
| 6,473,392 B1* | 10/2002 | Shiomi et al. | 720/738 |
| 6,651,917 B1 | 11/2003 | Momoi et al. | |
| 6,655,623 B1 | 12/2003 | Kaneda et al. | |
| 6,728,199 B1* | 4/2004 | Obata et al. | 720/738 |
| 2002/0047063 A1 | 4/2002 | Kaneda et al. | |
| 2003/0031118 A1* | 2/2003 | Shiomi et al. | 369/291 |
| 2003/0174640 A1* | 9/2003 | Iwaki et al. | 369/291 |
| 2004/0022172 A1* | 2/2004 | Obata et al. | 369/291 |
| 2004/0148624 A1* | 7/2004 | Inoue | 720/741 |

FOREIGN PATENT DOCUMENTS

JP    2002-50147    2/2002

OTHER PUBLICATIONS

English Language Abstract of JP 2002-50147.

* cited by examiner

*Primary Examiner*—A. J. Heinz
*Assistant Examiner*—Mark Blouin
(74) *Attorney, Agent, or Firm*—Greenblum & Bernstein, P.L.C.

(57) ABSTRACT

A disc cartridge includes a cartridge main body composed of a lower shell, in which a first opening that enables disc access for a disc-like recording medium in a housed state is formed, and an upper shell, a disc tray that is rotatably provided inside the cartridge main body and formed so that the recording medium can be mounted thereon, and a single shutter member disposed between the lower shell and the disc tray. A second opening, which enables disc access for the recording medium when the second opening overlaps the first opening in a thickness direction of the disc cartridge, is formed in the disc tray. The disc tray closes part of the first opening in a restricted state where the disc access is restricted, and is capable of opening the part of the first opening in a disc access state by being rotated inside the cartridge main body and causing the shutter member to slide. The shutter member closes another part of the first opening in the restricted state so as to close the first opening in concert with the disc tray, and in the disc access state the shutter member is caused to slide by the disc tray so as to be capable of opening the other part of the first opening.

5 Claims, 9 Drawing Sheets

DISC CARTRIDGE

BACKGROUND OF THE INVENTION

1. Field of the Invention

This invention relates to a disc cartridge where a disc-like recording medium is housed in a cartridge main body constructed of an upper shell and a lower shell.

2. Description of the Related Art

As one example of this type of disc cartridge, Japanese Laid-Open Patent Publication No. 2002-50147 discloses a disc cartridge in which an optical disc is housed in a cartridge case composed of an upper shell, a middle shell, and a lower shell. In this case, the middle shell is formed with a disc-like overall shape and an operated part, which is composed of a gear or the like that can be engaged by a shutter opening/closing means of a recording/reproducing apparatus, is formed in a circumferential surface thereof (a ring part). The middle shell is housed so as to be able to rotate within the casing formed by the upper shell and the lower shell. Openings that enable the recording and reproduction of recording data (i.e., disc access) for an optical disc in a housed state are formed in the middle shell and lower shell, with these openings being opened and closed by a pair of shutter members. In this case, the shutter members are formed with overall plate-like shapes and are formed with shaft parts, which are inserted through a support hole of the middle shell, and opening/closing channels into which operating projecting parts of the lower shell are inserted so as to pass through. By rotating the middle shell with respect to the lower shell, the shutter members are caused to slide by the middle shell to open and close the openings in the lower shell and the middle shell.

With this disc cartridge, in a normal state the opening in the lower shell is closed by the pair of shutter members and the middle shell. When the disc cartridge has been loaded into a recording/reproduction apparatus, the middle shell is rotated by the shutter opening/closing means of the recording/reproducing apparatus. At this time, the opening in the lower shell and the opening in the middle shell overlap in the thickness direction and the shutter members are caused to slide as the middle shell rotates so as to move away from each another. As a result, the opening in the lower shell is opened and disc access for the optical disc inside the disc cartridge becomes possible. On the other hand, when the disc cartridge is ejected from the recording/reproduction apparatus, the middle shell is rotated in the opposite direction to during loading by the shutter opening/closing means of the recording/reproducing apparatus. At this time, the openings in the lower shell and the middle shell cease to overlap, and the shutter members are caused to slide so as to move closer to each other as the middle shell rotates, thereby closing the opening. By doing so, the opening is opened or closed according to whether disc access is required for the optical disc.

However, by investigating the above conventional disc cartridge, the present inventors discovered the following problem. That is, with the above disc cartridge, the opening is opened or closed by the shutter opening/closing means of the recording/reproducing apparatus rotating the middle shell of the above disc cartridge so that the middle shell causes the pair of shutter members to slide with respect to the lower shell. In this case, when the middle shell is being rotated, the shaft parts of both shutter members are rotated in the support hole of the middle shell and the operating projecting parts of the lower shell are caused to relatively slide within the opening/closing channels of both shutter members. Accordingly, when opening and closing both shutter members, a large amount of force is required to rotate the middle shell (i.e., to open and close the shutter members) due to factors such as the sliding resistance between an edge of the support hole in the middle shell and circumferential surfaces of the shaft parts of the shutter members and the sliding resistance between edges of the opening/closing channels of the shutter members and the operating projecting parts of the lower shell. This means that with a conventional disc cartridge, there is the problem that it is difficult to smoothly open and close the shutter members. Since two shutter members are provided inside the cartridge casing, the conventional disc cartridge also has a problem in that the assembly process for the disc cartridge is complex, resulting in a high manufacturing cost.

SUMMARY OF THE INVENTION

The present invention was conceived in order to solve the above problems and it is a principal object of the present invention to provide a disc cartridge that has a reduced manufacturing cost and in which a shutter member can be smoothly opened and closed.

To achieve the stated object, a disc cartridge according to the present invention includes a cartridge main body composed of a lower shell, in which a first opening that enables disc access for a disc-like recording medium in a housed state is formed, and an upper shell, a disc tray that is rotatably provided inside the cartridge main body and formed so that the disc-like recording medium can be mounted thereon, and a single shutter member disposed between the lower shell and the disc tray, wherein a second opening, which enables disc access for the disc-like recording medium when the second opening overlaps the first opening in a thickness direction of the disc cartridge, is formed in the disc tray, the disc tray closes part of the first opening in a restricted state where the disc access is restricted, and is capable of opening the part of the first opening in a disc access state by being rotated inside the cartridge main body and causing the shutter member to slide, and the shutter member closes another part of the first opening in the restricted state so as to close the first opening in concert with the disc tray, and in the disc access state the shutter member is caused to slide by the disc tray so as to be capable of opening the other part of the first opening.

According to the above disc cartridge, a construction is used where part of the first opening is closed by the disc tray and another part of the first opening is closed by the single shutter member. Since there is a reduction in the number of components that move when opening or closing the first opening, it is possible to carry out opening and closing operations smoothly with little force. Also, unlike the conventional disc cartridge, a mechanism that opens and closes the first opening with only one shutter member is used, so that it is easy to assemble the disc cartridge, resulting in a considerable reduction in manufacturing cost.

In this case, it is preferable that one part of the shutter member is axially supported on the lower shell so that the shutter member is rotatable and the shutter member is formed with a guide channel, and the disc tray is formed with a pin member that is inserted through the guide channel, and when the disc tray is rotated during the disc access, the pin member is guided by the guide channel so that the disc tray is rotated on an arc-shaped path about the one end and is capable of causing the shutter member to slide. Alternatively, it is preferable that one part of the shutter member is axially supported on the lower shell so that the shutter member is rotatable and the shutter member is formed with a pin member, and the disc tray is formed with a guide channel through which the pin member can be inserted, and when the disc tray is rotated during the disc access, the pin member is guided by the guide channel so that the disc tray is rotated on an arc-shaped path about the one end and is capable of causing the shutter member to slide. By using either of these constructions, there is a reduction in contacting parts of the lower shell, the shutter member, and the disc tray, resulting in it being possible to considerably reduce sliding resistance during opening and closing operations for the first opening. In this way, it becomes possible to carry out smooth opening and closing operations for the shutter member using little force. In addition, since the construction is comparatively simple, the disc cartridge can be easily assembled, resulting in a considerable reduction in manufacturing cost.

It is also preferable that the shutter member includes a disc holding part that contacts an outer edge of the disc-like recording medium at a closed position, where the first opening is closed, to hold the disc-like recording medium and releases contact with the disc-like recording medium at an opened position, where the first opening is opened. By using this construction, it is possible to prevent the disc-like recording medium from rattling inside the cartridge main body, so that damage to the disc-like recording medium can be avoided. Although a construction where dedicated components are provided for holding the disc-like recording medium has the risk of an increase in manufacturing cost due to the assembly of the dedicated components, according to this disc cartridge, a construction is used where the disc-like recording medium can be held by the holding part formed on the shutter member, so that increases in the manufacturing cost of the disc cartridge can be avoided. Also, the disc-like recording medium is held by merely causing the shutter member to slide to the closed position and the holding of the disc-like recording medium is released by causing the shutter member to slide to the opened position, so that compared to a construction where dedicated components are provided separately to the shutter member and the dedicated components are caused to slide in accordance with rotation of the disc tray, a considerable reduction can be made in the force required to rotate the disc tray.

It is also preferable that an approximately circular disc insertion/removal opening, which enables the disc-like recording medium to be housed in and removed from the cartridge main body, is formed in the upper shell, and that a hole with a larger diameter than a center hole of the disc-like recording medium is formed at a position that faces the center hole at the closed position where the first opening is closed. By doing so, when the disc-like recording medium is inserted and removed, it is possible to deeply insert the user's index finger, for example, into the center hole and reliably pick up the disc-like recording medium. This means that it is possible to prevent the user from accidentally dropping the disc-like recording medium during insertion and removal.

It should be noted that the disclosure of the present invention relates to a content of Japanese Patent Application 2003-039135 that was filed on 18 Feb. 2003 and the entire content of which is herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Hereafter, a preferred embodiment of a disc cartridge according to the present invention will be described with reference to the attached drawings.

First, the construction of a disc cartridge 1 will be described with reference to the drawings.

Figure 1:
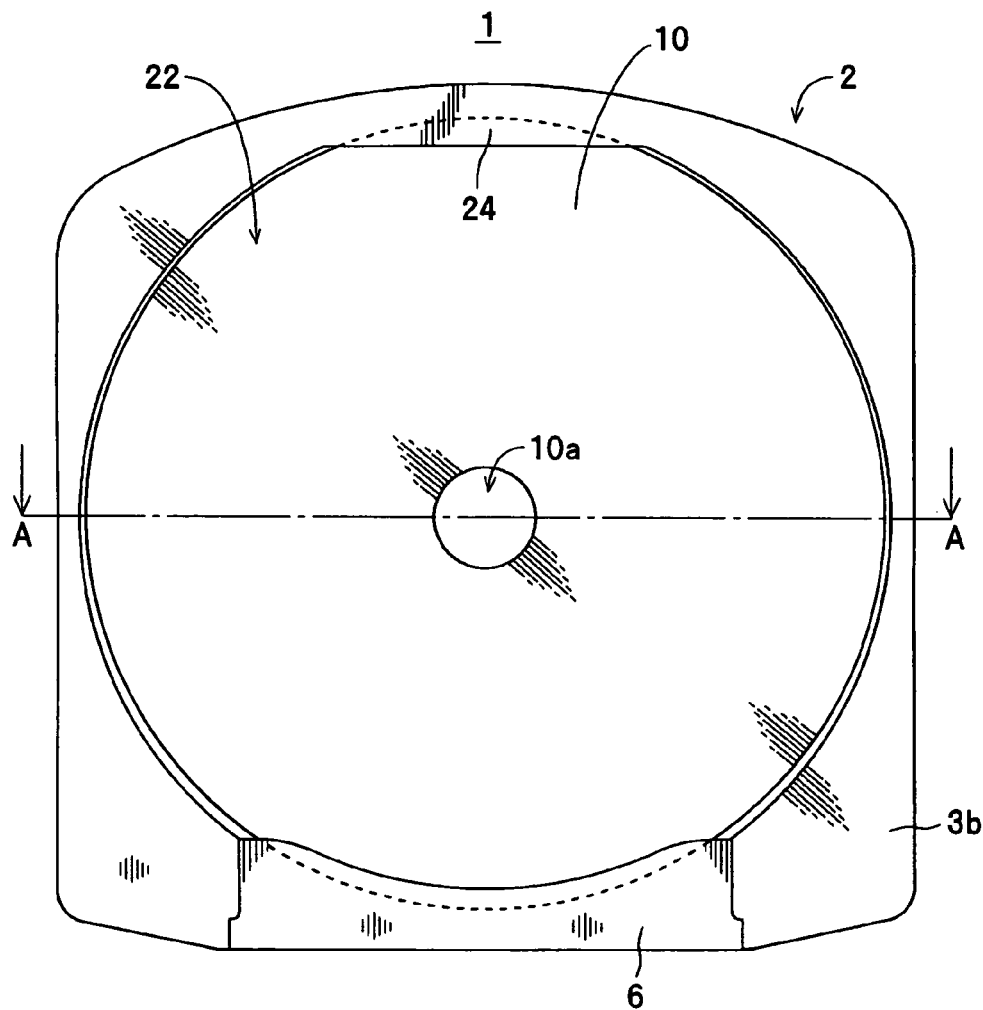
FIG. 1 is a plan view showing a disc cartridge according to an embodiment of the present invention.
Figure 2:
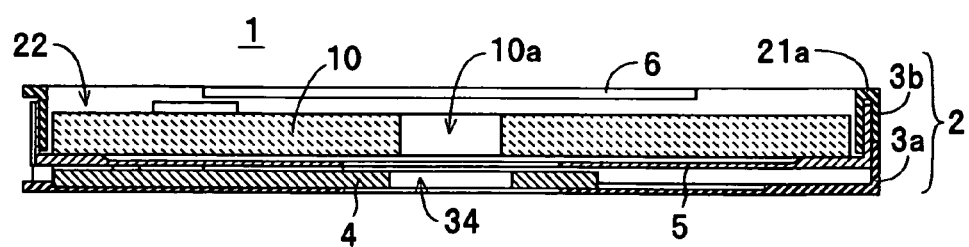
FIG. 2 is a cross-sectional view taken along a line A—A in FIG. 1.

The disc cartridge 1 shown in FIGS. 1 and 2 is a cartridge-type recording medium in which an optical disc 10 is removably housed. A disc cartridge 1 includes a cartridge main body 2, a single shutter member 4, a disc tray 5, and an upward movement restricting plate 6, and is also provided with a holding arm 7, a rotation restricting member 8, and an erroneous deletion preventing member 9 that are respectively shown in FIG. 11. It should be noted that for ease of understanding the present invention, the size of the disc cartridge in the thickness direction has been expanded in FIG. 2 and in FIGS. 4, 6, 8, and 10 described later. As one example, the optical disc 10 is a single-sided recordable disc-type recording medium, and as shown in FIGS. 1 and 2, a center hole 10a with a diameter of around 15 mm is provided in a central part of the optical disc 10 for chucking by a recording/reproduction apparatus (one example of a "disc drive" for the present invention). On the other hand, as shown in FIG. 2, the cartridge main body 2 includes a lower shell 3a and an upper shell 3b formed so as to be able to engage one another.

Figure 3:
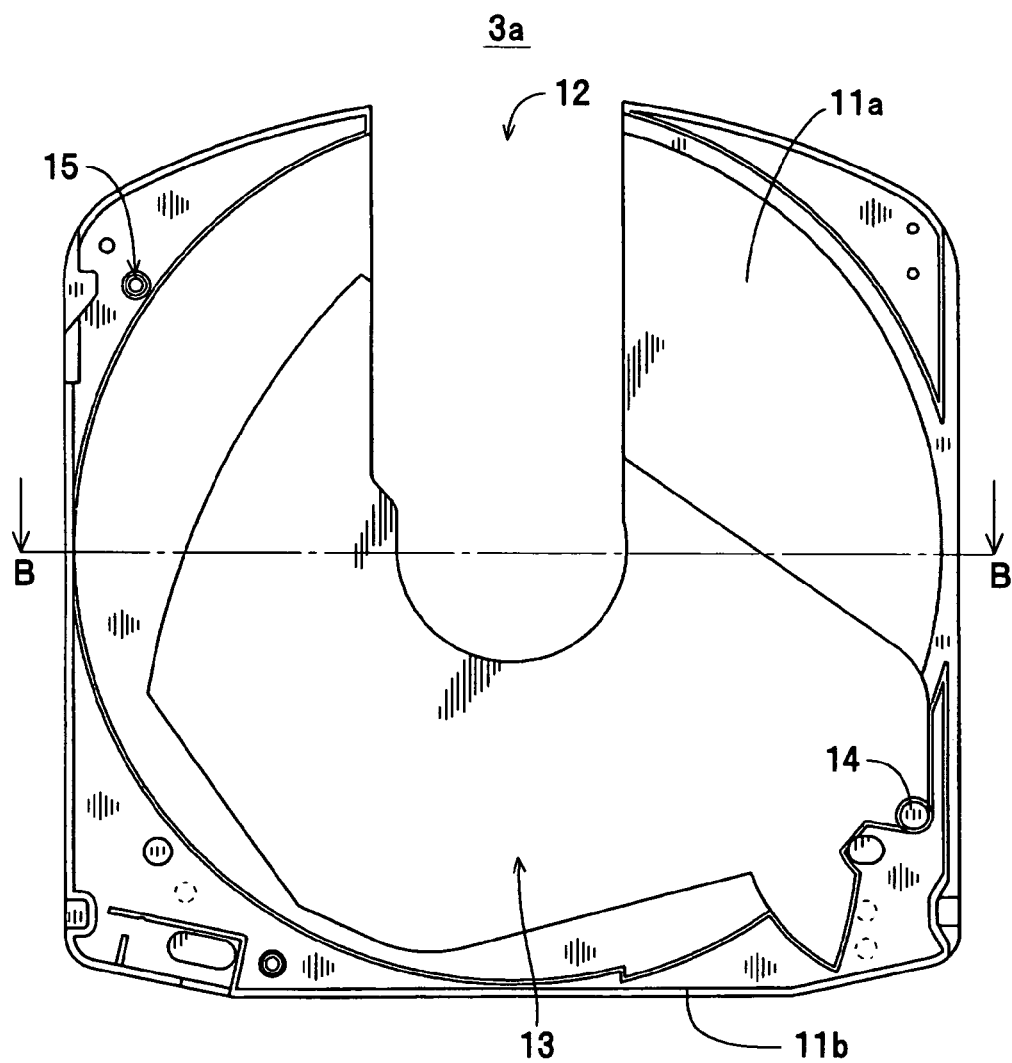
FIG. 3 is a plan view of a lower shell in a cartridge main body.
Figure 4:
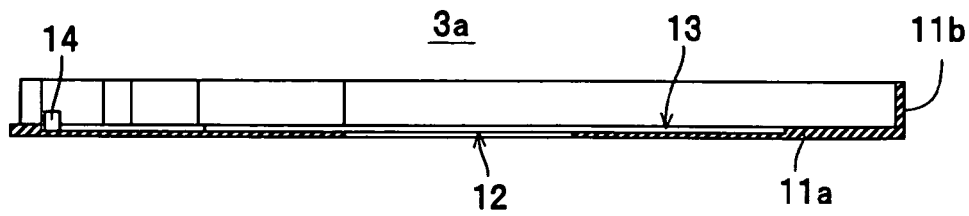
FIG. 4 is a cross-sectional view taken along a line B—B in FIG. 3.

As shown in FIGS. 3 and 4, the lower shell 3a is formed in the shape of a shallow plate and has a baseplate 11a in which an opening 12 (a "first opening" in the present invention) is formed and a side wall 11*b* that is provided upright on an outer edge of the baseplate 11*a* and constructs a side surface part of the disc cartridge 1. In this case, the opening 12 is a hole which, during recording and reproduction of recording data, enables disc access (chucking by the recording/reproduction apparatus, irradiation with a laser beam by a pickup, and the like) for the optical disc 10 housed inside the cartridge main body 2, and is formed with a size that exposes an area from the central part of the optical disc 10 to an outer edge. A recessed part 13, where a part corresponding to range of movement of the shutter member 4 has been made slim, is also formed in the baseplate 11*a*, and a pillar-shaped projecting part 14 for axially supporting the shutter member 4 to allow rotation of the shutter member 4 is provided upright on the recessed part 13. A recessed part 15 for attaching the holding arm 7 that together with the shutter member 4 holds the optical disc 10 is also formed in the baseplate 11*a*.

Figure 5:
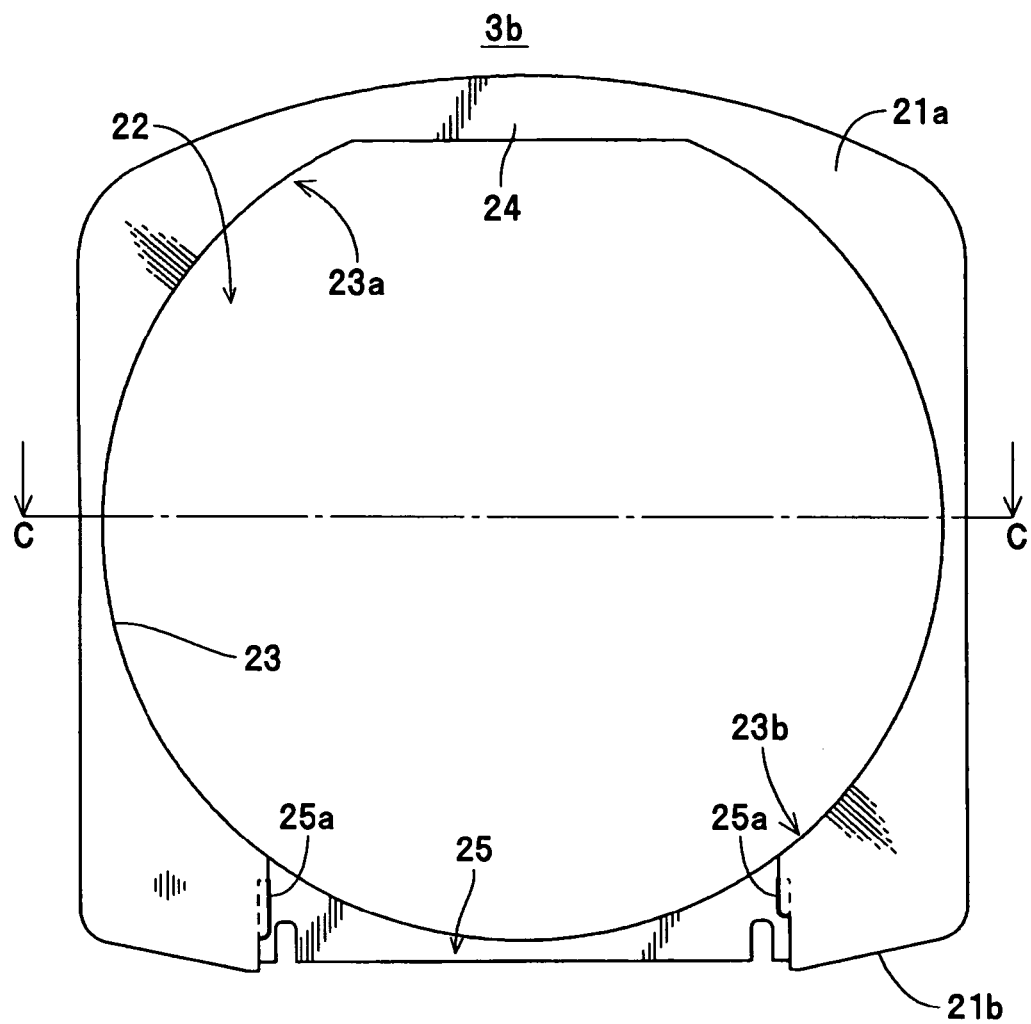
FIG. 5 is a plan view of an upper shell in the cartridge main body.
Figure 6:
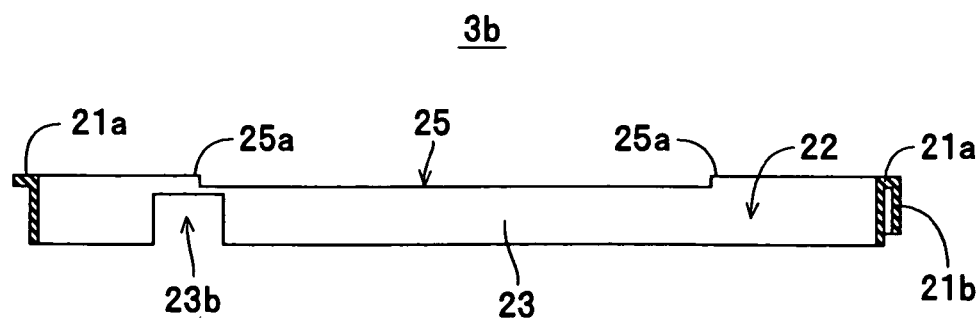
FIG. 6 is a cross-sectional view taken along a line C—C in FIG. 5.

As shown in FIGS. 5 and 6, the upper shell 3*b* is provided with a top plate 21*a* in which an approximately circular opening 22 (a "disc insertion/removal opening" in the present invention) is formed, a side wall 21*b* that is provided upright on an outer edge of the top plate 21*a* and together with the side wall 11*b* of the lower shell 3*a* constructs the side surface part of the disc cartridge 1, and a partition wall 23 that is provided upright at an edge of the opening 22. In this case, the opening 22 is a hole that enables the optical disc 10 housed inside the cartridge main body 2 to be removed to outside the cartridge main body 2 and to be inserted inside the cartridge main body 2. By forming the opening 22 so that part of an edge of the opening 22 projects inwards towards a center of the top plate 21*a*, an upward movement restricting part 24 for restricting upward movement of the optical disc 10 housed in the cartridge main body 2 is formed. In addition, an attachment part 25 with brim parts 25*a*, 25*a* for attaching the upward movement restricting plate 6 that together with the upward movement restricting part 24 restricts upward movement of the optical disc 10 is formed in the top plate 21*a*. Also, cut away parts 23*a*, 23*b* for enabling the holding arm 7 and a holding part 35 (see FIGS. 7 and 8) of the shutter member 4 to advance through the partition wall 23 are formed in the partition wall 23.

Figure 7:
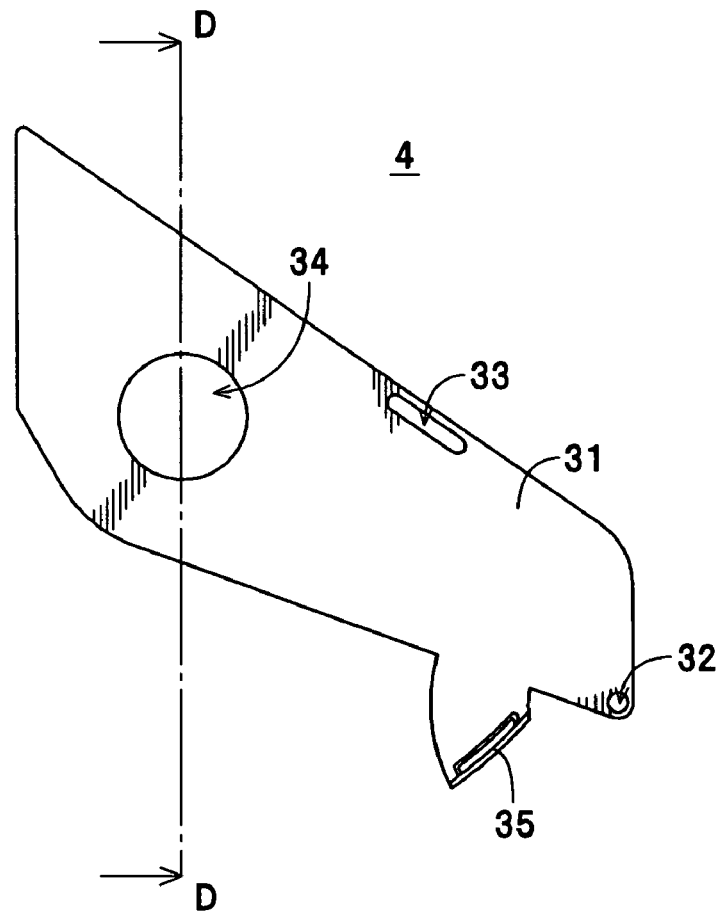
FIG. 7 is a plan view of a shutter member.
Figure 8:
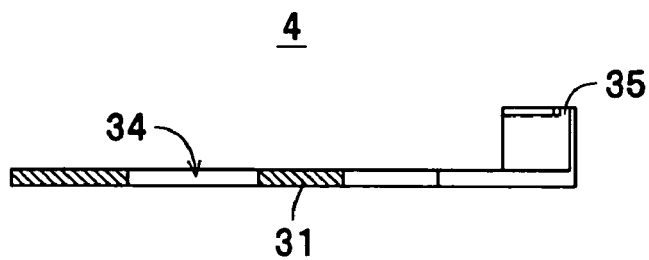
FIG. 8 is a cross-sectional view taken along a line D—D in FIG. 7.

As shown in FIGS. 7 and 8, the shutter member 4 includes a plate-like shutter main body 31 that has a hole 32 through which a projecting part 14 of the lower shell 3*a* can be inserted formed at one end of the shutter member 4, and a disc holding part (hereinafter "holding part") 35 that contacts an outer edge of the optical disc 10 and together with the holding arm 7 holds the optical disc 10 are formed. As shown in FIG. 2, the shutter member 4 is arranged inside the cartridge main body 2 so as to be sandwiched between the lower shell 3*a* and the disc tray 5. In this case, a slit 33 (a "guide channel" in the present invention) through which a projecting part 46 (see FIG. 9) provided upright on a lower surface of the disc tray 5 can be inserted is formed in the shutter main body 31. A hole 34 with a larger diameter (a diameter of 17 mm, for example) than the center hole 10*a* of the optical disc 10 is formed in the shutter main body 31 at a position that faces the center hole 10*a* of the optical disc 10 in a state where the shutter member 4 has been positioned at a "closed position" (described later).

Figure 9:
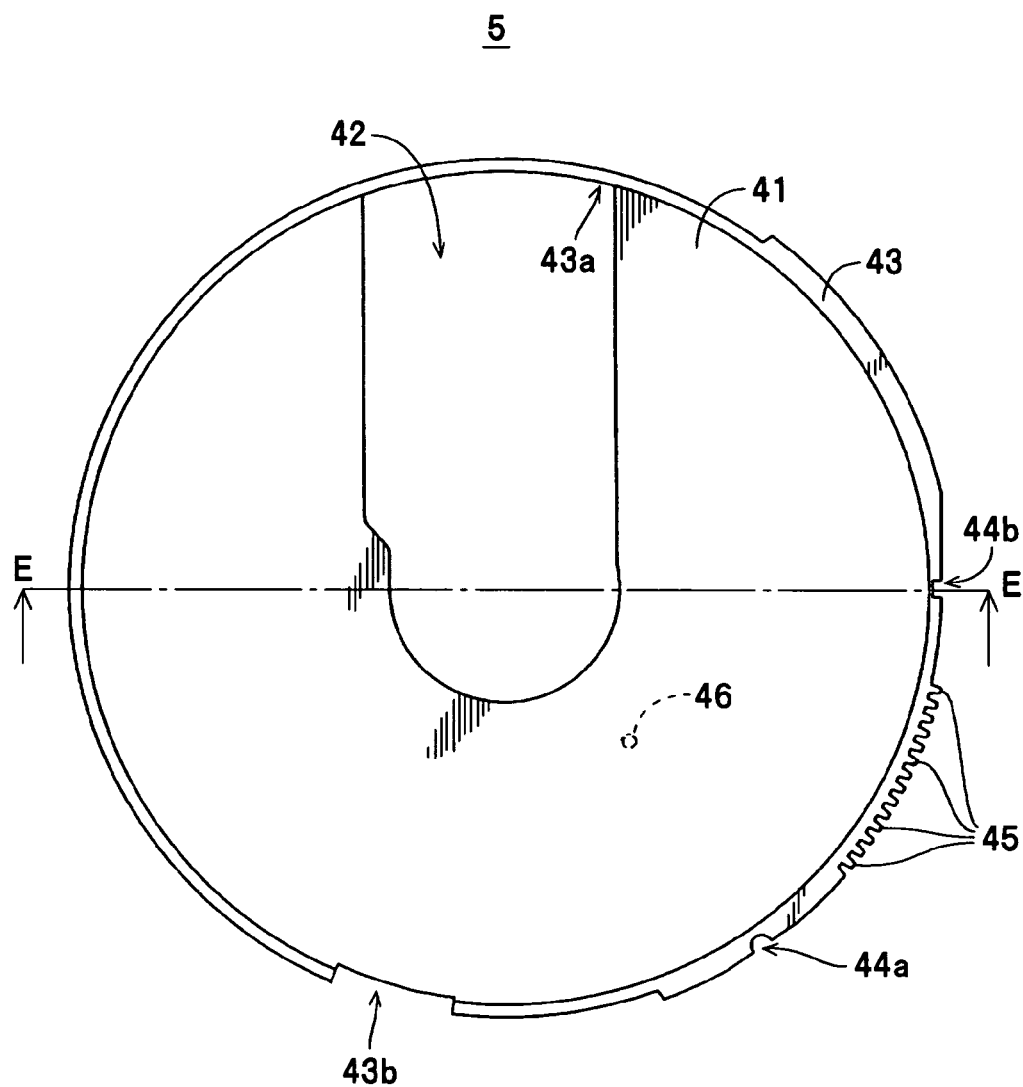
FIG. 9 is a plan view of a disc tray.
Figure 10:
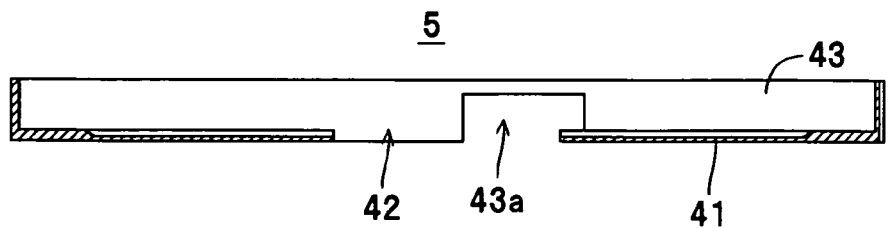
FIG. 10 is a cross-sectional view taken along a line E—E in FIG. 9.

As shown in FIGS. 9 and 10, the disc tray 5 is formed in the shape of a shallow plate on which the optical disc 10 can be placed and has a disc-like baseplate 41, in which an opening 42 (a "second opening" in the present invention) with approximately the same shape as the opening 12 of the lower shell 3*a* is formed, and a side wall 43 that is provided upright on an outer edge of the baseplate 41. As shown in FIG. 2, the disc tray 5 is housed inside the cartridge main body 2 together with the optical disc 10 so as to be rotatable. In this case, as shown in FIG. 9, a projecting part 46 (a "pin member" in the present invention) that is inserted through the slit 33 of the shutter member 4 is provided upright on a lower surface of the baseplate 41. Engaging recessed parts 44*a*, 44*b* and engaging projecting parts 45, 45 that can engage a shutter opening/closing means, not shown, of a recording/reproducing apparatus are also formed in the side wall 43. Also, as shown in FIGS. 9 and 10, cut away parts 43*a*, 43*b* are formed in the side wall 43. These cut away parts 43*a*, 43*b* overlap the cut away parts 23*a*, 23*b* formed in the partition wall 23 of the upper shell 3*b* in a plane of the disc cartridge 1 and enable the holding arm 7 and the holding part 35 of the shutter member 4, which have advanced inside the cut away parts 23*a*, 23*b*, to contact an outer edge of the optical disc 10 on the disc tray 5.

Figure 11:
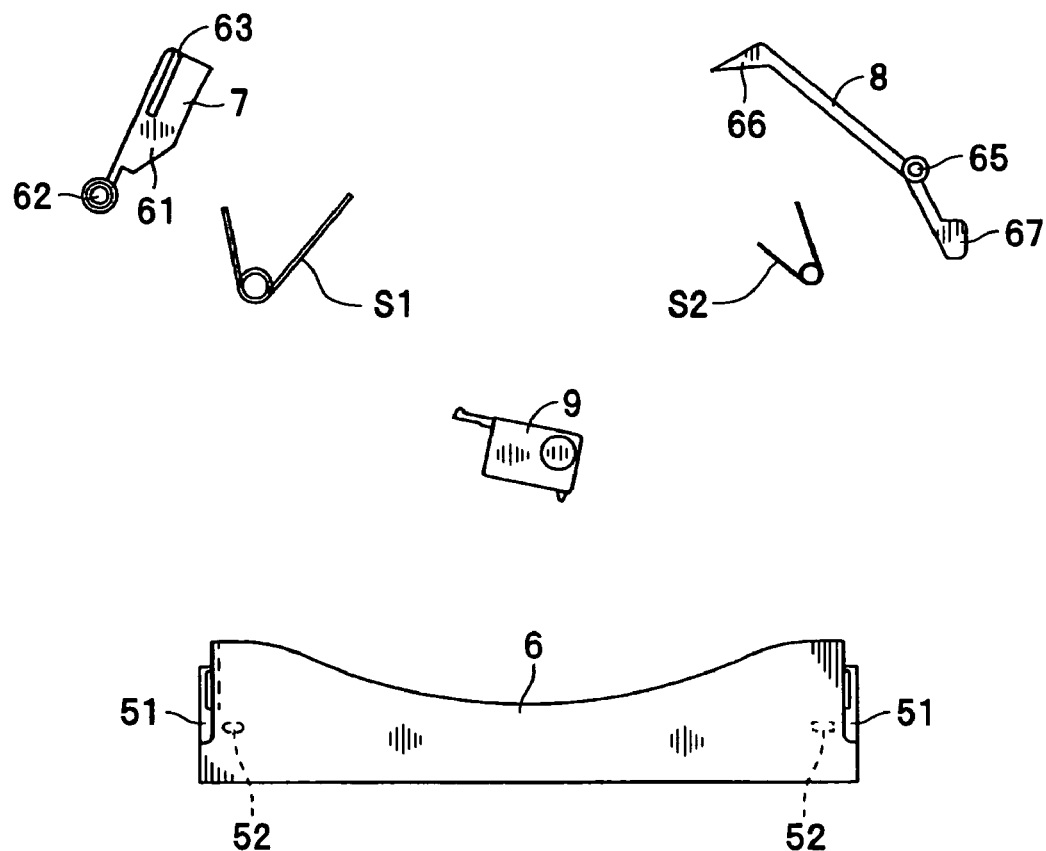
FIG. 11 is a plan view showing an upward movement restricting plate, a holding arm, a rotation restricting member, an erroneous deletion preventing member, and a spring.
Figure 12:
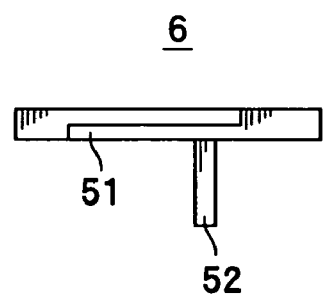
FIG. 12 is a side view of the upward movement restricting plate.

As shown in FIG. 2, the upward movement restricting plate 6 is formed in the shape of a flat plate so that when the upward movement restricting plate 6 has been attached to the upper shell 3*b*, a surface of the upward movement restricting plate 6 is flush with a surface of the top plate 21*a*. Also, as shown in FIGS. 11 and 12, flanges 51, 51 for attaching to the upper shell 3*b* are formed on the both sides of the upward movement restricting plate 6, and stoppers 52, 52 that contact an inner surface of the side wall 11*b* of the lower shell 3*a* when the upward movement restricting plate 6 is slid onto the upper shell 3*b* to stop the sliding are provided upright on the upward movement restricting plate 6. As shown in FIG. 1, this upward movement restricting plate 6 is positioned with one end (one end surface) projecting inwards into the opening 22 of the upper shell 3*b* and together with the upward movement restricting part 24 restricts upward movement of the optical disc 10 housed in the cartridge main body 2. As shown in FIG. 11, the holding arm 7 has a support plate 63 that contacts the outer edge of the optical disc 10 provided upright on a main plate 61 on which a pillar-shaped part 62 is also provided upright for attachment to the lower shell 3*a*. The pillar-shaped part 62 of this holding arm 7 is rotatably attached the recessed part 15 of the lower shell 3*a* and the main plate 61 and the support plate 63 are energized in a direction shown by an arrow L2 in FIG. 14 by a spring S1. In this case, by having the holding arm 7 advance into the cut away part 43*a* (see FIG. 10) of the disc tray 5 in a normal state ("restricted state") where disc access to the optical disc 10 is restricted, the support plate 63 contacts the outer edge of the optical disc 10 and the holding arm 7 holds the optical disc 10 inside the cartridge main body 2. Also, as described later, when the disc tray 5 is rotated, by having the side wall 43 of the disc tray 5 contact the main plate 61 to rotate the holding arm 7 in the direction shown by the arrow L1 in FIG. 13, the holding of the optical disc 10 by the support plate 63 is released.

Figure 13:
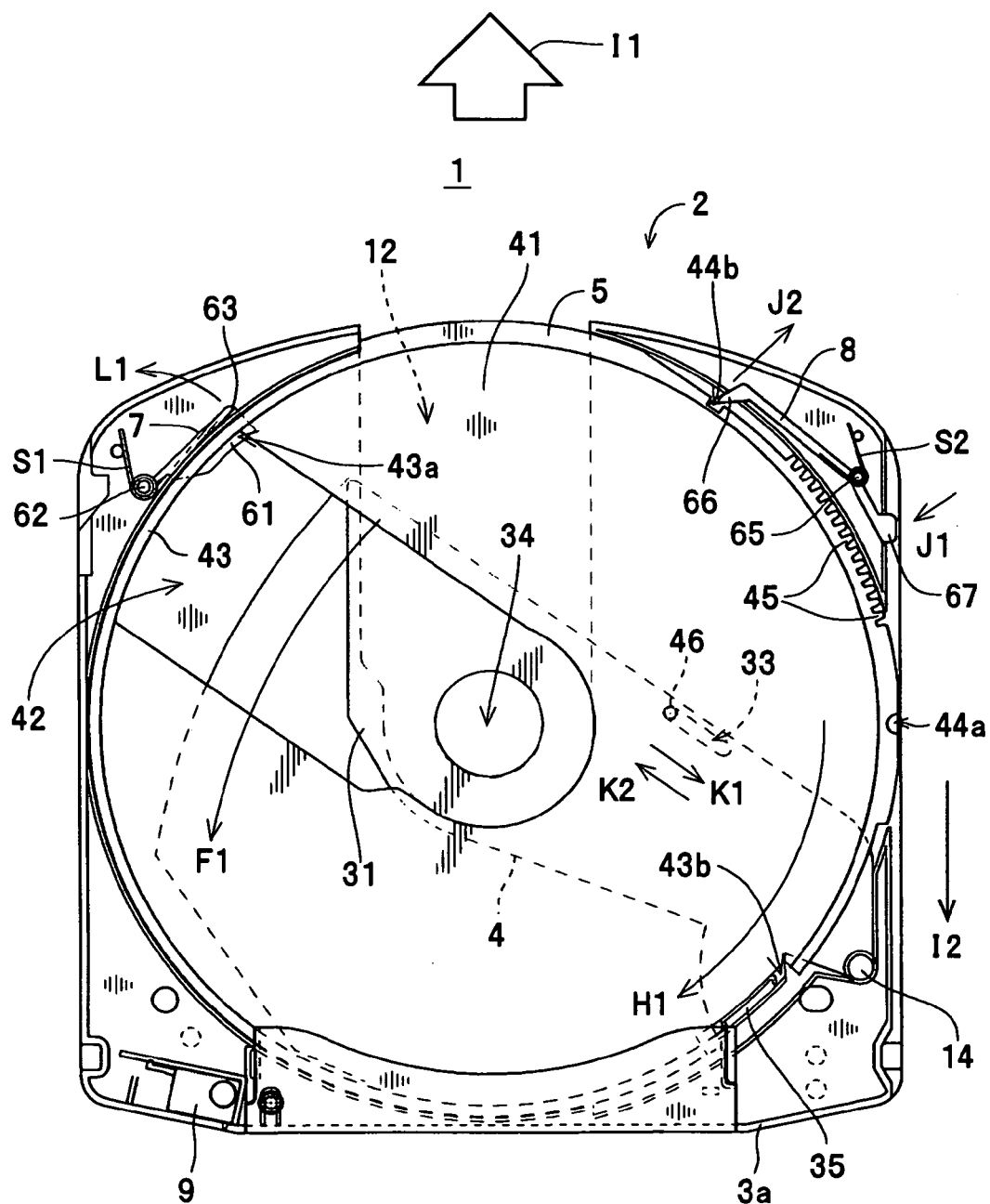
FIG. 13 is a plan view showing a state where an opening in the lower shell is closed by the disc tray and the shutter member.

As shown in FIG. 11, the rotation restricting member 8 is provided with a pillar-shaped part 65 for rotatably attaching the rotation restricting member 8 to the lower shell 3*a*, a hook part 66 for restricting the rotation of the disc tray 5 through engagement with the engaging recessed part 44*b* of the disc tray 5, and a contact part 67 for contacting the shutter opening/closing means when the disc cartridge 1 has been loaded into the recording/reproduction apparatus. As shown in FIG. 13, this rotation restricting member 8 is energized by a spring S2 in a direction in which the hook part 66 engages the engaging recessed part 44*b* of the disc tray 5 and thereby restricts rotation of the disc tray 5. When the disc cartridge 1 has been loaded into the recording/reproduction apparatus, the shutter opening/closing means contacts the contact part 67 and the rotation restricting member 8 is rotated about the pillar-shaped part 65 in a direction where the hook part 66 moves away from the side wall 43 so that the restriction on the rotation of the disc tray 5 is released. As shown in FIG. 13, the erroneous deletion preventing member 9 is attached to the cartridge main body 2 and can slide between a release position where recording of recording data (or erasing of recording data) on the disc cartridge 1 is possible and a restricted position where recording of recording data (or erasing of recording data) is restricted.

Next, a method of using the disc cartridge 1 will be described with reference to the drawings.

As shown in FIG. 13, when this disc cartridge 1 has been ejected from the recording/reproduction apparatus, the opening 12 of the lower shell 3a is closed by the baseplate 41 of the disc tray 5 and the shutter main body 31 of the shutter member 4. More specifically, the disc tray 5 is positioned in a state where the disc tray 5 is rotated by around 45° anticlockwise (i.e. leftwards) in FIG. 13 from a position where the opening 42 and the opening 12 of the lower shell 3a overlap in the thickness direction of the disc cartridge 1 (hereinafter, this position is referred to as the "opened position"). By doing so, an open-end side of the opening 12 (a position at which disc access is possible for the outer edge side of the optical disc 10) is closed by the baseplate 41 of the disc tray 5 (hereinafter, a position that closes the open-end side of the opening 12 is referred to as the "closed position"). It should be noted that the optical disc 10 and the upper shell 3b have been omitted from FIGS. 13, 14, and 15 for ease of understanding the present invention. The shutter member 4 is positioned at a position where the hole 34 in the shutter member 4 overlaps the center hole 10a of the optical disc 10. Accordingly, an end part of the opening 12 on the central part side of the cartridge main body 2 is closed by the shutter main body 31 (hereinafter a position at which the end part of the opening 12 on the central part side is closed is referred to as the "closed position"). In this way, in a normal state, the opening 12 of the disc cartridge 1 is closed by the baseplate 41 of the disc tray 5 and the shutter main body 31 of the shutter member 4.

Also, in the normal state of the disc cartridge 1, the holding arm 7 and the holding part 35 of the shutter member 4 respectively advance inside the cut away parts 43a, 43b of the disc tray 5 so that the optical disc 10 is held between the holding arm 7 and the holding part 35. Accordingly, the optical disc 10 is prevented from rattling inside the cartridge main body 2. Also, as shown in FIG. 1, the optical disc 10 housed inside the cartridge main body 2 is prevented from moving upwards and coming out of the cartridge main body 2 by the upward movement restricting part 24 of the upper shell 3b and the upward movement restricting plate 6.

On the other hand, when the disc cartridge 1 is loaded into the recording/reproduction apparatus, the recording/reproduction apparatus pulls the disc cartridge 1 inside the apparatus. At this time, the shutter opening/closing means of the recording/reproduction apparatus rotates the disc tray 5 so that the shutter member 4 is caused to slide and the opening 12 is opened. More specifically, when the disc cartridge 1 is loaded with the orientation shown by an arrow 11 in FIG. 13, the shutter opening/closing means of the recording/reproduction apparatus moves relative to the disc cartridge 1 in a direction shown by an arrow 12. At this time, due to the shutter opening/closing means contacting the contact part 67 of the rotation restricting member 8, the contact part 67 is moved (rotated) about the pillar-shaped part 65 in the direction shown by an arrow J1. Together with such movement, the hook part 66 is moved (rotated) in the direction shown by an arrow J2, and as a result the engagement of the engaging recessed part 44b of the disc tray 5 and the hook part 66 is released and rotation of the disc tray 5 is permitted. Next, when the disc cartridge 1 has been pulled further into the apparatus in the direction shown by the arrow 11, the shutter opening/closing means engages the engaging projecting parts 45, 45 of the disc tray 5. After this, when the disc cartridge 1 has been pulled further into the apparatus, the disc tray 5 is rotated in the direction shown by an arrow H1.

Figure 14:
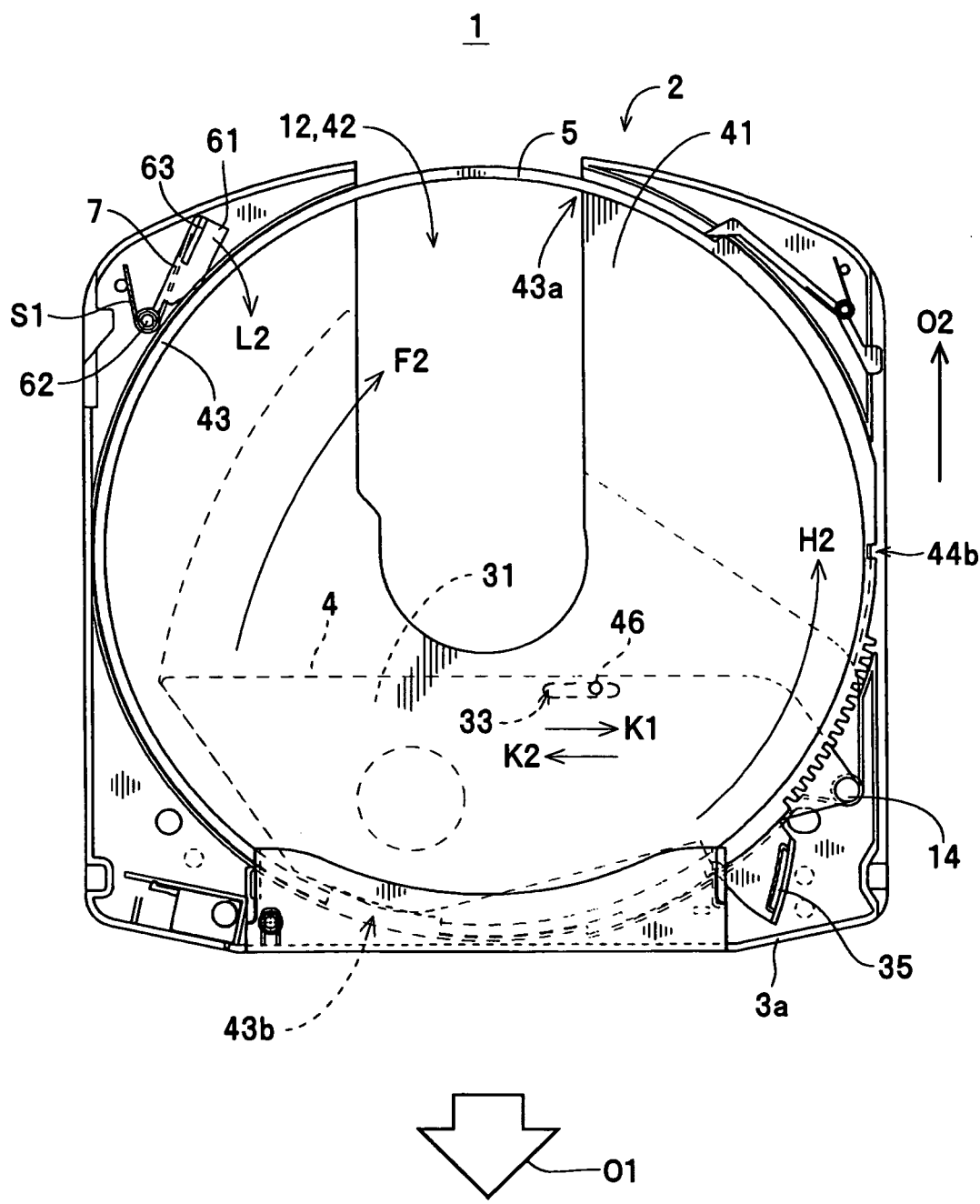
FIG. 14 is a plan view showing a state where the opening in the lower shell is open.

At this time, the disc tray 5 rotates towards the opened position, and as shown in FIG. 14, the opening 42 of the disc tray 5 becomes overlapped with the opening 12 of the lower shell 3a in the thickness direction of the disc cartridge 1. As a result, the open end of the opening 12 that was closed by the baseplate 41 is opened. As a result of the side wall 43 contacting the main plate 61 of the holding arm 7 due to the rotation of the disc tray 5, the holding arm 7 rotates about the pillar-shaped part 62 in the direction of an arrow L1 shown in FIG. 13 and as shown in FIG. 14, the holding of the optical disc 10 by the holding arm 7 is released. In addition, when the disc tray 5 has rotated, the projecting part 46 of the disc tray 5 is caused to slide in a direction shown by an arrow K1 in FIG. 13 within the slit 33 of the shutter member 4 and is then caused to slide in the direction shown by an arrow K2. Together with this, the shutter member 4 is caused to slide in a direction of the arrow F1 in an arc-shaped path centered on a projecting part 14 with respect to the lower shell 3a. As a result, as shown in FIG. 14, the shutter member 4 is moved away from the opening 12 of the lower shell 3a (hereinafter, this position is also referred to as the "opened position") and the end of the opening 12 on the central part side that was closed by the shutter main body 31 is opened. As the shutter member 4 slides, the holding part 35 moves away from the outer edge of the optical disc 10 (the contact is released), and as a result the holding of the optical disc 10 by the holding part 35 is released. By doing so, the opening of the opening 12 and the releasing of the optical disc 10 are completed, and it becomes possible to carry out disc access to the optical disc 10 from outside the cartridge main body 2. After this, the edge of the center hole 10a is chucked by the recording/reproduction apparatus and the optical disc 10 is irradiated by a laser beam (i.e., recording data is recorded or reproduced) via the openings 12 and 42.

On the other hand, when the disc cartridge 1 for which the recording/reproduction of recording data has been completed is ejected from the recording/reproduction apparatus, the disc tray 5 is rotated by the shutter opening/closing means of the recording/reproduction apparatus and by doing so, the shutter member 4 is caused to slide so as to close the opening 12. More specifically when the disc cartridge 1 is ejected in the direction shown by an arrow O1 shown in FIG. 14 by the recording/reproduction apparatus, the shutter opening/closing means of the recording/reproduction apparatus moves with respect to the disc cartridge 1 in a direction shown by an arrow O2. At this time, the disc tray 5 is rotated in the direction of an arrow H2 towards the closed position, and as shown in FIG. 13, the open end of the opening 12 in the lower shell 3a is closed by the baseplate 41 of the disc tray 5. As the disc tray 5 rotates, the holding arm 7 advances inside the cut-away part 43a of the side wall 43 and the support plate 63 contacts the outer edge of the optical disc 10, resulting in the optical disc 10 being held by the holding arm 7.

In addition, as the disc tray 5 rotates, the projecting part 46 of the disc tray 5 is caused to slide inside the slit 33 of the shutter member 4 in a direction shown by the arrow K1 in FIG. 14 and then in the direction shown by the arrow K2. Together with this movement, the shutter member 4 is caused to slide in the direction shown by the arrow F2 on an arc-shaped path about the projecting part 14 towards the closed position. As a result, as shown in FIG. 13, the end of the opening 12 on the central part side is closed by the shutter main body 31 of the shutter member 4. As the shutter member 4 slides, the holding part 35 advances inside the cut-away part 43b of the disc tray 5 and contacts the outer edge of the optical disc 10. As a result, the optical disc 10 is held by the holding part 35. Also, when the disc tray 5 rotates as far as the closed position, as shown in FIG. 13, the hook part 66 of the rotation restricting member 8 engages the engaging recessed part 44b of the disc tray 5, resulting in the rotation of the disc tray 5 being restricted. By doing so, the closing of the opening 12 and the holding of the optical disc 10 are completed.

Figure 15:
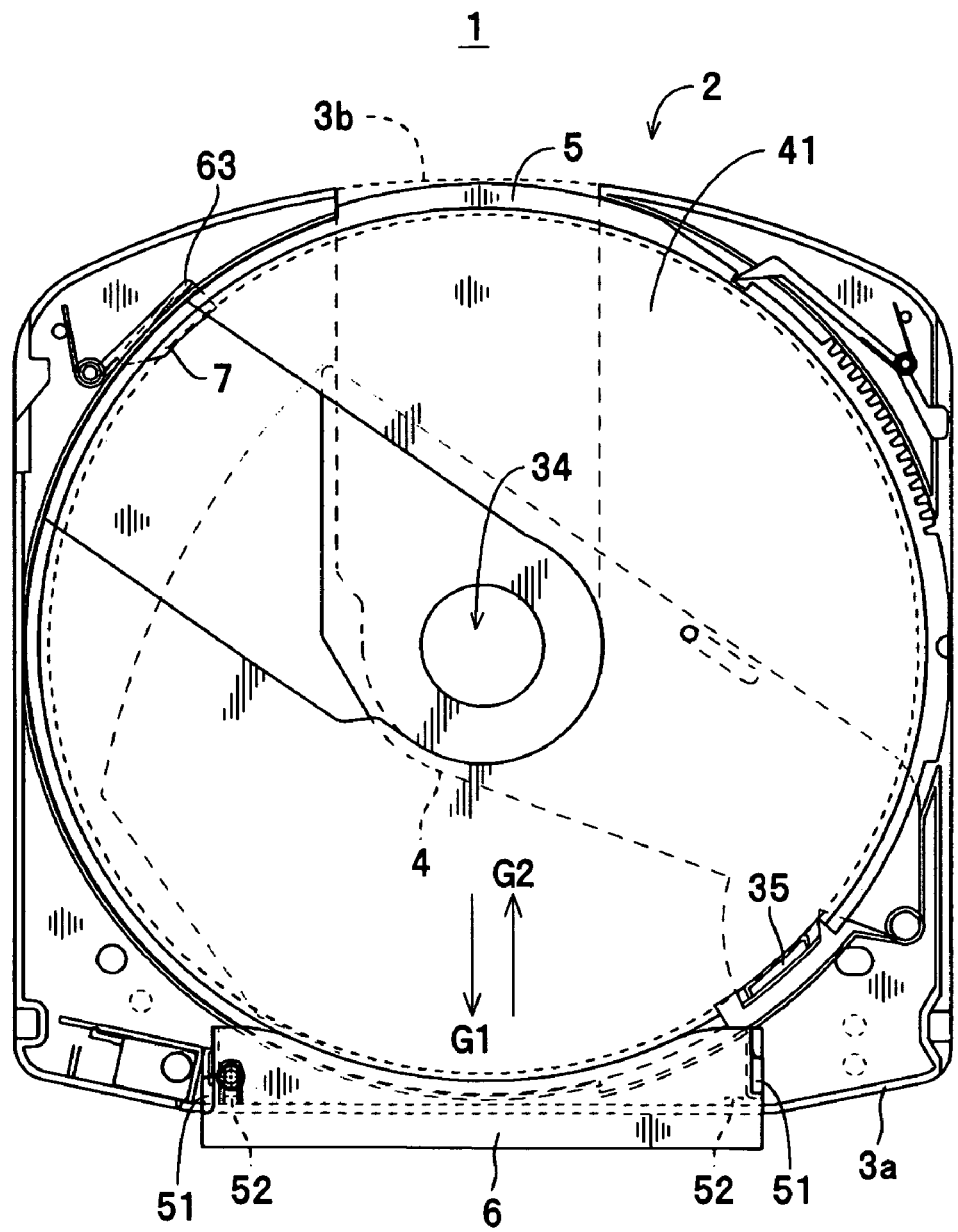
FIG. 15 is a plan view showing a state where the upward movement restricting plate has been caused to slide with respect to the cartridge main body.

On the other hand, with this disc cartridge 1, it is possible to remove the optical disc 10 housed inside the cartridge main body 2 from the cartridge main body 2 and for example to reproduce the recording data using a normal disc drive, to house a blank disc (an unrecorded optical disc 10) inside the cartridge main body 2, and to carry out the recording and reproduction of recording data on the blank disc in this state. More specifically, as shown in FIG. 15, first the upward movement restricting plate 6 is caused to slide with respect to the cartridge main body 2 in the direction shown by an arrow G1. By doing so, the restriction of upward movement of the optical disc 10 by the upward movement restricting plate 6 is removed. Next, the user inserts his/her index finger, for example into the center hole 10a of the optical disc 10 and lifts the optical disc 10 out of the cartridge main body 2. At this time, as shown in FIG. 2, since the hole 34 of the shutter member 4 is formed with a larger diameter than the center hole 10a of the optical disc 10, the user's index finger can be inserted deeply into the center hole 10a. Next, by lifting up the end part on the side where upward movement was restricted by the upward movement restricting plate 6, the optical disc 10 is removed from the cartridge main body 2. After this, the removed optical disc 10 is set in a disc drive and the reproduction of recording data and the like is carried out.

When a blank disc has been housed in the cartridge main body 2, in a state where the user's index finger has been inserted into the center hole 10a of the blank disc, the blank disc is housed inside the cartridge main body 2 by inserting one end of the blank disc between the baseplate 41 of the disc tray 5 and the upward movement restricting part 24 of the upper shell 3b. Next, the upward movement restricting plate 6 is caused to slide in the direction shown by the arrow G2 shown in FIG. 15. At this time, a tip of the upward movement restricting plate 6 projects out above the blank disc, resulting in upward movement of the blank disc being restricted by the upward movement restricting part 24 of the upper shell 3b and the upward movement restricting plate 6. After this, by loading the disc cartridge 1 in the recording/reproduction apparatus as described above, the recording or reproduction of recording data is carried out for the blank disc.

In this way, according to this disc cartridge 1, a construction is used where part (the open end part) of the opening 12 is closed by the disc tray 5 and another part (the central part) of the opening 12 is closed by the single shutter member 4, so that a reduced number of components move during an operation that opens or closes the opening 12, resulting in it being possible to smoothly carry out opening and closing operations for the shutter member 4 using little force. Also, unlike the conventional disc cartridge, by using a mechanism that opens and closes the opening 12 using a single shutter member 4, it is possible to easily assemble the disc cartridge 1, resulting in a considerable reduction in manufacturing cost.

Also, according to this disc cartridge 1, in a state where one end of the shutter member 4 is axially supported on the lower shell 3a so as to allow rotation and the projecting part 46 is inserted into the slit 33, rotation of the disc tray 5 results in the shutter member 4 moving in an arc-shaped path about that end. The reduction in the contacting parts of the lower shell 3a, the shutter member 4, and the disc tray 5 makes it possible to considerably reduce the slide resistance during opening and closing operations for the opening 12. This makes it possible to carry out opening and closing operations of the shutter member 4 smoothly with little force. In addition, since the disc cartridge 1 has a relatively simple structure, the disc cartridge 1 can be assembled easily, resulting in a considerable reduction in manufacturing cost.

In addition, according to the disc cartridge 1, the holding part 35 that contacts the outer edge of the optical disc 10 at the closed position and for which contact with the optical disc 10 is released at the opened position is formed on the shutter member 4, so that the optical disc 10 can be prevented from rattling inside the cartridge main body 2, and as a result damage to the optical disc 10 can be prevented. Although a construction where dedicated components are provided for holding the optical disc 10 has the risk of an increase in manufacturing cost due to the assembly of the dedicated components, according to the disc cartridge 1, a construction is used where the optical disc 10 can be held by the holding part 35 formed on the shutter member 4, so that increases in the manufacturing cost of the disc cartridge 1 can be avoided. Also, the optical disc 10 is held by merely causing the shutter member 4 to slide the closed position and the holding of the optical disc 10 is released by causing the shutter member 4 to slide to the opened position, so that compared to a construction where dedicated components are provided separately to the shutter member 4 and the dedicated components are caused to slide in accordance with rotation of the disc tray 5, a considerable reduction can be made in the force required to rotate the disc tray 5.

The disc cartridge 1 is equipped with the shutter member 4 in which the hole 34 that has a larger diameter than the center hole 10a is formed at a position which faces the center hole 10a of the optical disc 10 at the closed position, so that when the optical disc 10 is inserted and removed, it is possible to deeply insert the user's index finger, for example, into the center hole 10a and reliably pickup the optical disc 10. This means that it is possible to prevent the user from accidentally dropping the optical disc 10 during insertion and removal.

It should be noted that the present invention is not limited to the embodiment described above. For example, although an example of a disc cartridge 1 where a recordable optical disc 10 is enclosed inside the cartridge main body 2 is described in the above embodiment of the present invention, the disc-type recording medium of the present invention is not limited to this and it is possible to construct a disc cartridge that encloses various types of optical disc, such as a read-only optical disc and a rewritable optical disc. The disc-type recording medium of the present invention includes not just optical discs but also magneto-optical discs and magnetic discs. In addition, although an example where an opening 22 is formed in the upper shell 3*b* so that the optical disc 10 can be removed from the cartridge main body 2 has been described above in the embodiment of the present invention, the disc cartridge of present invention is not limited to this and it is possible to form the top plate 21*a* of the upper shell 3*b* in the form of a flat plate and construct the disc cartridge 1 so that the optical disc 10 is not removable. When this construction is used, the hole 34 in the shutter member 4 and the upward movement restricting plate 6 are not required.

In the above embodiment of the present invention, an example of a construction where the projecting part 14 of the lower shell 3*a* is inserted through the hole 32 of the shutter member 4 so that the shutter member 4 is rotatably supported on the lower shell 3*a* is described, but the present invention is not limited to this and it is possible to use a construction where the shutter member 4 is rotatably supported on the lower shell 3*a* by having a cylindrical projecting part formed on the shutter member 4 inserted into a recessed part formed in the lower shell 3*a*. In addition, it is possible to use a construction where the shutter member 4 is rotatably supported on the lower shell 3*a* by a pin member formed separately to the lower shell 3*a* and the shutter member 4. Also, although an example of a construction where the slit 33 ("guide channel") is provided in the shutter member 4 and the projecting part 46 (pin member) is formed on the disc tray 5 has been described, the present invention is not limited to this and it is also possible to use a construction where a pin member is formed on the shutter member 4, a guide channel is formed in the disc tray 5, and the shutter member 4 is caused to slide when the disc tray 5 is rotated.

What is claimed is:

1. A disc cartridge, comprising:
   a cartridge main body composed of a lower shell, in which a first opening that enables access to a disc is formed, and an upper shell;
   a disc tray rotatably provided inside the cartridge main body and formed so that the disc can be mounted thereon; and
   a single shutter member disposed between the lower shell and the disc tray,
   wherein a second opening, which enables access to the disc when the second opening overlaps the first opening in a thickness direction of the disc cartridge, is formed in the disc tray, the disc tray covering a first part of the first opening in a restricted state where access to the disc is restricted, uncovering the first part of the first opening in a disc access state by rotating inside the cartridge main body, and causing the shutter member to slide, and
   the shutter member covers a remaining part of the first opening not covered by the disc tray in the restricted state so as to cover the first opening in concert with the disc tray, and in the disc access state the shutter member is caused to slide by the disc tray so as to uncover the remaining part of the first opening.

2. A disc cartridge according to claim 1,
   wherein one end of the shutter member is axially supported on the lower shell so that the shutter member is rotatable and the shutter member is formed with a guide channel, and
   the disc tray is formed with a pin member that is inserted into the guide channel, such that when the disc tray is rotated during the disc access state, the pin member is guided by the guide channel to cause the shutter member to slide and rotate on an arc-shaped path about the one end.

3. A disc cartridge according to claim 1,
   wherein one end of the shutter member is axially supported on the lower shell so that the shutter member is rotatable and the shutter member is formed with a pin member, and
   the disc tray is formed with a guide channel in which the pin member is inserted, such that when the disc tray is rotated during the disc access state, the pin member is guided by the guide channel to cause the shutter member to slide and rotate on an arc-shaped path about the one end.

4. A disc cartridge according to claim 1,
   wherein the shutter member includes a disc holding part that contacts an outer edge of the disc at a covered position, where the first opening is covered, to hold the disc, and releases contact with the disc at an uncovered position, where the first opening is uncovered.

5. A disc cartridge according to claim 1,
   wherein an approximately circular disc insertion/removal opening, which enables the disc to be housed in and removed from the cartridge main body, is formed in the upper shell, and
   a hole with a larger diameter than a center hole of the disc is formed at a position that faces the center hole at a covered position where the first opening is covered.

* * * * *

UNITED STATES PATENT AND TRADEMARK OFFICE
CERTIFICATE OF CORRECTION

PATENT NO.       : 7,114,166 B2                                             Page 1 of 1
APPLICATION NO.  : 10/778074
DATED            : September 26, 2006
INVENTOR(S)      : Kenji Hashizume et al.

It is certified that error appears in the above-identified patent and that said Letters Patent is hereby corrected as shown below:

On the Title Page of the printed patent, at Item (56), U.S. Patent Documents, "6,473,392 B1" should read --6,473,392 B2--

On the Title Page of the printed patent, at Item (56), U.S. Patent Documents, "6,728,199 B1" should read --6,728,199 B2--

Signed and Sealed this

Twenty-seventh Day of November, 2007

JON W. DUDAS
*Director of the United States Patent and Trademark Office*